United States Patent [19]

Bertrand

[11] 4,316,437
[45] Feb. 23, 1982

[54] ACCELERATION CONTROLLING DEVICE FOR AN AUTOMOBILE VEHICLE

[75] Inventor: Bernard Bertrand, Vernouillet, France

[73] Assignee: Automobiles Peugeot, Paris, France

[21] Appl. No.: 154,991

[22] Filed: May 30, 1980

Related U.S. Application Data

[63] Continuation of Ser. No. 859,209, Dec. 9, 1977, abandoned.

[30] Foreign Application Priority Data

Dec. 29, 1976 [FR] France .................. 76 39459

[51] Int. Cl.³ .............................................. F01L 1/34
[52] U.S. Cl. .................. 123/90.18; 123/321; 123/405
[58] Field of Search ............... 123/90.16, 90.17, 90.18, 123/321, 389, 402, 405

[56] References Cited

U.S. PATENT DOCUMENTS

| | | | |
|---|---|---|---|
| 1,651,402 | 12/1927 | Midgley | 123/90.18 |
| 2,528,983 | 11/1950 | Weiss | 123/90.18 |
| 3,113,561 | 12/1963 | Heintz | 123/90.18 |
| 3,547,089 | 12/1970 | Pierlot | 123/423 |
| 3,945,355 | 3/1976 | Calviac | 123/90.18 |

FOREIGN PATENT DOCUMENTS 2270443  3/1974  France .................. 123/90.18

Primary Examiner—Charles J. Myhre
Assistant Examiner—W. R. Wolfe
Attorney, Agent, or Firm—Burns, Doane, Swecker & Mathis

[57] ABSTRACT

The device comprises a modulating device for modulating the action of a shifting device. The latter axially shifts the camshaft of the engine which camshaft varies the timing and the extent of opening of cylinder valves in accordance with its axial position. The arrangement is such that the action of the modulating device is controlled by the position of the accelerator pedal. Moreover, this arrangement constitutes the sole device for controlling the acceleration of the engine to the exclusion of an accelerator pedal-actuated throttle.

6 Claims, 2 Drawing Figures

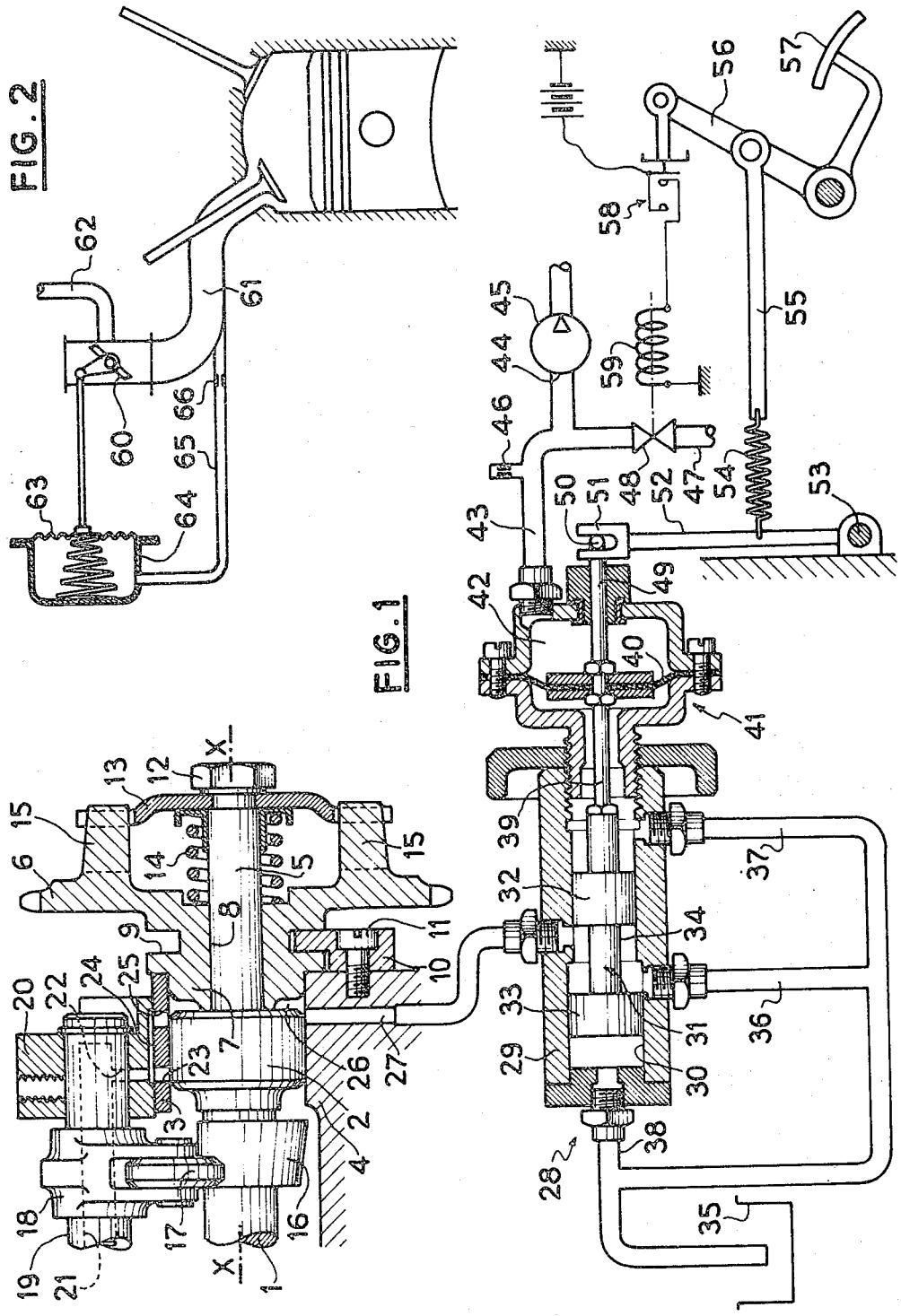

ACCELERATION CONTROLLING DEVICE FOR AN AUTOMOBILE VEHICLE

This is a continuation of application Ser. No. 859,209, filed Dec. 9, 1977, now abandoned.

The present invention relates to a device for controlling the acceleration of an automobile vehicle driven by an internal combustion engine having a variable cylinder valve actuating system, that is to say, an engine provided with a camshaft which is movable axially and has cams having an evolutive profile for the purpose of varying the angle of opening and closing and the extent of the lift of the valves.

In engines having a variable valve actuating system, the axial displacement of the camshaft is effected either in a continuous manner or in an "off-on" manner, in accordance with the conditions of operation of the engine, that is to say the load and/or the speed of the engine.

Moreover, the speed of the vehicle is subjected to the action of the driver on the accelerator pedal which acts on the angle of opening of a butterfly valve member placed in the fuel supply or induction pipe so as to limit to a variable extent the amount of air-fuel mixture introduced into the cylinders of the engine.

Now, the presence of this valve member is not without drawbacks. Indeed, the rapid closure or opening of the valve member results in sudden variations in the magnitude of the suction prevailing in the induction pipe which disturbs the conditions of the supply of fuel to the engine. Consequently, there is in the exhaust gases an increased content of polluting substances, mainly carbon monoxide and unburnt hydrocarbons during the transitional phases of operation of the engine.

An object of the invention is to avoid the drawbacks resulting from variations in the magnitude of the suction in the induction pipe due to the presence of the butterfly valve member, by means of a device which permits controlling the amount of air-fuel mixture introduced into the cylinders, not in the region of a butterfly valve member placed in the induction pipe, but in the region of the inlet valves in the cylinder.

In this way, the conditions of fuel supply to the engine are considerably improved in the transitional stages both as concerns deceleration and acceleration.

This device furthermore permits increasing, in the region of the inlet valves, the speed of introduction of the mixture, mainly in respect of partial loads, which ensures an improved preparation of this mixture authorizing the use of weaker mixtures.

According to the invention, there is provided an acceleration controlling device for an automobile vehicle comprising an accelerator pedal and an internal combustion engine provided with a camshaft having a variable cylinder valve actuating system associated with axial shifting means and modulating means for modulating said shifting means, wherein said modulating means is controlled by the position of the accelerator pedal.

According to a specific feature of the invention, said axial shifting means for the camshaft comprises a piston cooperating with a fixed cylinder for defining a chamber which is fed with engine lubricating oil and connected to a discharge through said modulating means which comprise a slide valve capable of closing in a variable manner a discharge orifice, said slide valve of the modulating means being connected to the accelerator pedal through mechanical means.

According to another feature of the invention, the device further comprises a pressure-responsive vessel connected to a source of pressure which represents the speed of operation of the engine, the vessel having a movable diaphragm connected to the slide valve of the modulating means, the mechanical connecting means between said slive valve and the accelerator pedal comprising a connecting rod connecting the slide valve to the diaphragm of the vessel, an extension of said rod extending beyond said diaphragm and pivoted to the end of a pivotal lever which is connected to an arm of said accelerator pedal through elastically yieldable means and a rod.

One embodiment of the invention will be described hereinunder with reference to the accompanying drawings in which:

FIG. 1 is an assembly diagram of the device according to the invention;

FIG. 2 is a diagram of an auxiliary device for maintaining in the inlet pipe a certain suction at a practically constant level.

In FIG. 1 there is shown one end of a camshaft 1 having an axis X-X and carrying a journal 2 journalled in a bearing 3 formed in the cylinder head 4 of an engine. The camshaft is also supported and guided in the known manner by other journals and other bearings (not shown).

Outside the journal 2 the camshaft 1 is axially extended by a cylindrical portion 5.

A gear pinion 6 driven in the conventional manner by the crankshaft of the engine (not shown), comprises a hub 7 which is journalled in the bearing 3 and has a bore 8 which cooperates with the cylindrical portion 5 of the camshaft.

The hub 7 has a groove 9 in which is engaged a block 10 secured to the cylinder head 4 by a screw 11. This block has for function to hold the gear pinion 6 axially stationary.

At the end of the cylindrical portion 5 of the camshaft 1 a fork 13 is blocked by a screw 12 and a spring 14 is compressed between the fork 13 and the pinion 6.

The fork 13 is driven in rotation by two tenons 15 which are integral with the pinion 6 and along which it is freely slidable without clearance.

The camshaft 1 carries cams such as 16 which have a an axially evolutive shape or profile. Bearing on each cam 16 is a roller 17 carried by one end of a rocker 18 which is pivotally mounted on a shaft 19. The other end of this rocker cooperates with the stem of an inlet or exhaust valve (not shown).

The rocker shaft 19 is fixed in supports such as 20 which are fixed to the cylinder head 4. In the known manner, this shaft 19 is hollow and its central cavity 21 which is fed with oil under pressure by the pump of the engine, performs the function of a passageway for lubricating the rockers and the bearings of the camshaft. Thus the bearing 3 receives the oil under pressure from the passageway 21 by way of orifices 22 and 23.

The orifice 22 also communicates by way of a throttled passage 24 with an orifice 25 which communicates inside the bearing 3 with a chamber 26 formed between the journal 2 and the hub 7 of the gear pinion 6. The chamber 26 is connected to a pressure modulating means 28 by way of a pipe 27.

The latter comprises mainly a cylindrical body 29 provided with a stepped inner bore 30 in which is slidable a slide valve 31 comprising a first piston 32 and a second piston 33 whose diameter is slightly larger than the diameter of the first piston. The pipe 27 leads to a chamber 34 formed in the bore 30 between the pistons 32 and 33. The chamber 34 may be connected to the oil tank 35 of the engine by a pipe 36, and pipes 37 and 38 receive the leakages of oil from the ends of the modulating means 28.

The slide valve 31 is extended by a rod 39 which is fixed to a flexible diaphragm 40 of a suction vessel 41 which forms with the diaphragm a chamber 42. The latter communicates by way of a pipe 43 with the suction or inlet orifice 44 of a volumetric pump 45 driven by the engine of the vehicle. The pipe 43 communicates with the atmosphere by way of a calibrated orifice 46. It may also communicate with the atmosphere by way of a non-throttled passageway 47 which is normally maintained opened by an electrically-operated valve 48.

The rod 39 is extended beyond the diaphragm 40 by a rod 49 which comprises, outside the vessel 41, a head 50 disposed between the branches of a fork member 51 of a lever 52. The lever 52 is pivoted to a fixed pin 53 and it is connected by a spring 54 and a rod 55 to an arm 56 which is integral with the accelerator pedal 57 of the vehicle.

An electric contact 58, connected in series with the coil 59 of the electrically-operated valve 58, is associated with the arm 56 and arranged to close when the accelerator pedal is fully depressed.

In the device just described, the conditions of raising the valves (height, opening and closing angles) depend on the axial position of the camshaft 1.

This position is determined by the equilibrium which is established between the action of the spring 14, the axial reaction exerted by the cams owing to their profile and the thrust exerted by the oil pressure acting in the chamber 26.

This pressure is regulated by the modulating means 28 and varies in accordance with the section of the passage through the pipe 36 which is controlled by the piston 33 of the slide valve 31.

As long as the electrically-operated valve 48 is open, the position of the slide valve 31 is subjected to the action of the spring 54.

The depression of the pedal 57 tends to shift the slide-valve 31 toward the right as viewed in the Figures so as to close progressively the pipe 36. Consequently, there is an increase in pressure in the chamber 26 and an axial displacement of the camshaft 1 in the direction which produces an increased opening of the inlet valves in magnitude and duration. There results an increase in the speed of the vehicle.

When the pedal 57 is completely depressed, the closure of the contact 58 causes the closure of the electrically-operated valve 48 and the pump 45 puts the chamber 42 under suction.

This suction increases with the speed of the engine, and this permits obtaining at full load an additional displacement of the camshaft as a function of the engine speed.

With the device just described, it is therefore possible to act on the speed of the vehicle without having an accelerator butterfly valve member or throttle so that the induction pipe constantly remains at a pressure close to atmospheric pressure which permits eliminating the drawbacks mentioned hereinbefore due to the rapid variations in the magnitude of the suction during the transitional stages of utilization of the engine.

Furthermore, at partial loads, the throttling of the air-fuel mixture no longer occurs in the region of the butterfly valve member but in the region of the inlet valves and this ensures an improved preparation of the mixture which authorizes the use of weaker mixtures.

However, it may be desirable to maintain a slight suction in the induction pipe for:

improving the distribution of the richness between the various cylinders of the engine;

ensuring a good operation of the carburettor.

This is why the foregoing device may be advantageously completed by a suction regulator, such as that shown in FIG. 2. This regulator comprises a butterfly valve member or throttle 60 disposed in the induction pipe 61 slightly upstream of a branch pipe 62 which is adapted to put the carburettor of the engine in communication with said suction.

The butterfly valve member 60 is connected to a diaphragm 63 of a suction vessel 64 which communicates with the induction pipe 61 by way of a pipe 65 provided with a calibrated orifice.

This supplementary device permits maintaining in the pipe 61 a slight suction of a substantially constant value, since any tendency toward an increase in the suction results in a larger opening of the valve member 60.

The suction may be, for example, regulated at a value in the neighbourhood of 100 mm of mercury.

In this way all the advantages related to the presence of a suction in the induction pipe are retained without the drawbacks produced by rapid variations in the suction related to the presence of the conventional butterfly valve member which is driven directly by the accelerator pedal.

Having now described my invention what I claim as new and desire to secure by Letters Patent is:

1. An acceleration controlling device for an automobile vehicle comprising an accelerator pedal, an internal combustion engine having a camshaft which is operative to achieve variation in the timing and extent of opening of cylinder valves which are associated with the camshaft and controlled by the camshaft, axial shifting means combined with the camshaft for axially shifting the camshaft, modulating means including a slide valve which is combined with the shifting means for modulating the action of said shifting means, means for controlling said modulating means as a function of the position of the accelerator pedal, said axial shifting means for the camshaft comprising a fixed cylinder, a piston cooperative with the fixed cylinder and defining a chamber, means for feeding oil employed for lubricating the engine to said chamber, means connecting the chamber to discharge through said modulating means and comprising means defining a discharge orifice, mechanical means connecting said slide valve to the accelerator pedal, a source of pressure which represents the speed of the engine, a pressure-responsive vessel which is connected to said source, said vessel having a movable diaphragm connected to the slide valve of the modulating means, the mechanical means connecting said slide valve to the accelerator pedal comprising a connecting rod connecting the slide valve to the diaphragm of the vessel, an extension of said rod extending beyond said diaphragm, a pivotal lever having an end portion, said rod extension being pivoted to the end portion of the pivotal lever, the accelerator pedal having an arm and elastically yieldable means and a rod connecting the accelerator pedal arm to said end portion of the lever.

2. A device as claimed in claim 1, wherein said source of pressure representing the speed of the engine is a volumetric pump, and a pipe communicating with the atmosphere by way of a calibrated orifice connects said vessel to the pump, and a normally-open electrically-operated valve having an actuating oil is inserted in said pipe and is capable of also connecting said pipe to the atmosphere, a source of electric current and a circuit including a switch connecting the coil to said source, said accelerator pedal being cooperative with said switch for opening said switch when the accelerator is depressed.

3. In a control device for an automobile vehicle comprising an accelerator pedal, an internal combustion engine having an induction pipe and an axially movable camshaft which is operative to achieve variation in the timing and extent of opening of cylinder valves which are associated with the camshaft and controlled by the camshaft, axial shifting means combined with the camshaft for axially shifting the camshaft and modulating means combined with the shifting means for modulating the action of said shifting means; the improvement wherein means are provided for controlling said modulating means as a function of the extent of depression of the accelerator pedal and said control device constitutes the sole means for controlling the acceleration of the engine independently of any adjustable throttling means disposed in said induction pipe.

4. A device as claimed in claim 3, wherein said axial shifting means for the camshaft comprises a fixed cylinder, a piston cooperative with the fixed cylinder and defining a chamber, means for feeding oil employed for lubricating the engine to said chamber, and means connecting the chamber to discharge through said modulating means and comprising means defining a discharge orifice, a slide valve which closes in a variable manner said discharge orifice, and mechanical means connecting said slide valve to the accelerator pedal.

5. A device as claimed in claim 3, further comprising an induction pipe of the engine and a suction regulator combined with the induction pipe to maintain a roughly constant suction in said induction pipe.

6. A device as claimed in claim 5, wherein said engine has a carburettor and the suction regulator comprises a butterfly valve member disposed in the induction pipe, a branch pipe communicating with the induction pipe slightly downstream of the butterfly valve member for putting the carburettor in communication with said suction, and a suction vessel having a diaphragm provided with a calibrated orifice putting the suction vessel in communication with the induction pipe, the butterfly valve member being connected to said diaphragm.

* * * * *